United States Patent [19]

Mollenauer

[11] Patent Number: 5,035,481

[45] Date of Patent: Jul. 30, 1991

[54] LONG DISTANCE SOLITON LIGHTWAVE COMMUNICATION SYSTEM

[75] Inventor: Linn F. Mollenauer, Colts Neck, N.J.

[73] Assignee: AT&T Bell Laboratories, Murray Hill, N.J.

[21] Appl. No.: 571,963

[22] Filed: Aug. 23, 1990

[51] Int. Cl.[5] .......... G02B 6/28; G02B 6/02; H04J 1/00; G02F 1/00

[52] U.S. Cl. .......... 350/96.16; 370/3; 455/610; 350/96.29

[58] Field of Search .......... 350/96.15-96.16, 350/96.29; 455/610-612; 370/3

[56] References Cited

U.S. PATENT DOCUMENTS 4,558,921 12/1985 Hasegawa et al. .......... 350/96.29
4,700,339 10/1987 Gordon et al. .......... 455/608

OTHER PUBLICATIONS

A. Hasegawa, Applied Optics, vol. 23, No. 19, Oct. 1, 1984, "Numerical Study of Optical Soliton . . . ", pp. 3302–3309.

L. F. Mollenauer et al., IEEE J. Quant. Elec., vol. QE-22, No. 1, Jan. 1986, "Soliton Propagation in Long Fibers . . . ", pp. 157–173.

C. Desem et al., Optics Letters, vol. 12, No. 5, May 1987, "Soliton Interaction in the Presence of Loss . . . ", pp. 349–351.

M. Nakazawa et al., Elec. Lett., vol. 25, No. 3, Feb. 2, 1989, "Soliton Amplification and Transmission with $Er^{3+}$. . . ", pp. 199–200.

K. Suzuki et al., Optics Lett., vol. 14, No. 6, Mar. 15, 1989, "Parametric Soliton Laser", pp. 320–322.

M. Nakazawa et al., J. Appl. Phys., 66 (7), Oct. 1, 1989, "Wavelength Multiple Soliton Amplification . . . ", pp. 2803–2812.

K. Iwatsuki et al., Elec. Lett., vol. 26, No. 1, Jan. 4, 1990, "2.8 Gbits/Optical Soliton Transmission . . . ", pp. 1–2.

M. Nakazawa et al., IEEE Photonics Techn. Lett., vol. 2, No. 3, Mar. 1990, "3.2–5 Gb/s, 100 km Error-Free Soliton Transmissions . . . ", pp. 216–219.

H. Kubota et al., IEEE J. Quant. Elec., vol. 26, No. 4, Apr. 1990, "Long-Distance Optical Soliton Transmission . . . ", pp. 692–700.

K. Suzuki et al., Elec. Lett., vol. 26, No. 8, Apr. 12, 1990, "5 Gbit/s, 250 km Error-Free Soliton . . . ", pp. 551–553.

K. Suzuki et al., Elec. Lett., vol. 26, No. 14, Jul. 5, 1990, "Automatic Optical Soliton Control . . . ", pp. 1032–1033.

*Primary Examiner*—Akm Ullah
*Attorney, Agent, or Firm*—Gregory C. Ranieri

[57] ABSTRACT

Long distance soliton lightwave communications systems are considered for next generation application in terrestrial and transoceanic environments. These systems employ a chain of lumped fiber amplifiers interconnected by long spans of dispersion shifted optical fiber. In such systems, resultant pulse distortion and dispersive wave radiation are minimized when the soliton period is long relative to the perturbation length which is the longer of either the amplification period defined in terms of the length of the optical fiber span between consecutive amplifiers or the dispersion period defined in terms of the length over which the dispersion exhibits a periodic characteristic. Additional system parameters for optimized soliton transmission include the relationships of both the path-average soliton power to the normal soliton power and the path-average dispersion from one optical fiber span to the next. Single channel and wavelength division multiplexed systems are disclosed.

21 Claims, 5 Drawing Sheets

LONG DISTANCE SOLITON LIGHTWAVE COMMUNICATION SYSTEM

TECHNICAL FIELD

This invention relates to lightwave communication systems and, more specifically, to systems which support propagation of soliton pulses.

BACKGROUND OF THE INVENTION

Lightwave communication systems, especially, long-haul lightwave communication systems, remain under active development worldwide. Techniques and apparatus are being reported for achieving much longer communication distances at progressively higher bit rates. In such systems, fiber nonlinearities and dispersion tend to limit the available alternatives for modulation formats which can accommodate the data speed requirements while being relatively unaffected by the nonlinearities.

Since propagation of soliton pulses in optical fiber depends on the presence of group velocity dispersion in the fiber, soliton pulse propagation has been proposed as one method for transporting lightwave information in a telecommunications system. See, for example, U.S. Pat. No. 4,558,921 which discloses a soliton-based optical fiber telecommunications system and U.S. Pat. No. 4,700,339 which discloses a wavelength division multiplexed soliton-based optical fiber telecommunications system employing periodic Raman amplification to compensate fiber loss. In order to overcome intrinsic losses in the optical fiber, non-electronic amplification elements are disposed along the telecommunication system to amplify the soliton pulses. Non-electronic amplification elements provide amplification of the signal as a photon pulse without changing it into an electron pulse. These amplification elements include doped-fiber amplifiers, semiconductor traveling wave amplifiers, Raman amplifiers, and phase coherent, continuous wave, injection amplifiers. In the '921 patent, non-electronic amplification elements are taught as providing the additional required capability of decreasing the width of the soliton pulses while simultaneously increasing their peak power.

As the length of the entire telecommunication system exceeds several hundred kilometers, it is necessary to space amplification elements apart by a predetermined distance to form an amplification chain along the length of the optical fiber. That is, a plurality of optical amplifiers are interconnected by individual lengths of optical fiber. Spacing of amplification elements continues to be a relatively inexact science for single channel systems owing perhaps to the specification by long haul telecommunication systems designers that, for cost and future system maintenance reasons, the interamplifier spacing should be on the order of 100 km. Such a specification disregards effects on system performance and quality. In wavelength division multiplexed soliton systems, the spacing of Raman amplifier pump sources was determined to be an appropriate distance which would introduce only a small velocity (wavelength) shift of the soliton pulses. For the '339 patent, the interamplifier spacing L for Raman pump sources was determined in relation to the soliton period, $z_0$, as $z_0 > L/4$. In that patent, it was also recommended that the interamplifier spacing satisfying $z_0 < L/16$ was also recommended as desirable to overcome soliton stability problems in the vicinity of $z_0 \approx L/8$. While these guidelines exist for Raman amplification systems, there are no clear guidelines for interamplifier spacings in lumped amplifier systems such as those systems including doped-fiber amplifiers.

SUMMARY OF THE INVENTION

Resultant pulse distortion and dispersive wave radiation are minimized in long distance soliton lightwave communication systems employing a chain of lumped fiber amplifiers interconnected by long spans of optical fiber by incorporating transmitters or radiation sources which generate pulses having a soliton period much longer than the perturbation length of the system, by utilizing optical amplifiers which are controlled to provide sufficient gain for the soliton pulses so that the path-average soliton power is substantially equal to the normal soliton power, and by including optical fiber segments which are interconnected to span the system in such a manner that the dispersion characteristic of the system is substantially periodic to cause the path-average dispersion to be substantially equal from one optical fiber span to the next. The perturbation length is defined as the much longer of either the amplification period defined in terms of the length of the optical fiber span between consecutive amplifiers or the dispersion period defined in terms of the minimum length over which the dispersion exhibits a periodic characteristic.

Embodiments of single channel systems and wavelength division multiplexed systems are described. For wavelength division multiplexed operation, it is shown that the interchannel separation results in a soliton-soliton collision length for pulses from different wavelength channels which collision length should be greater than or equal to twice the perturbation length.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION OF SINGLE CHANNEL SOLITON TRANSMISSION SYSTEM

Figure 1:
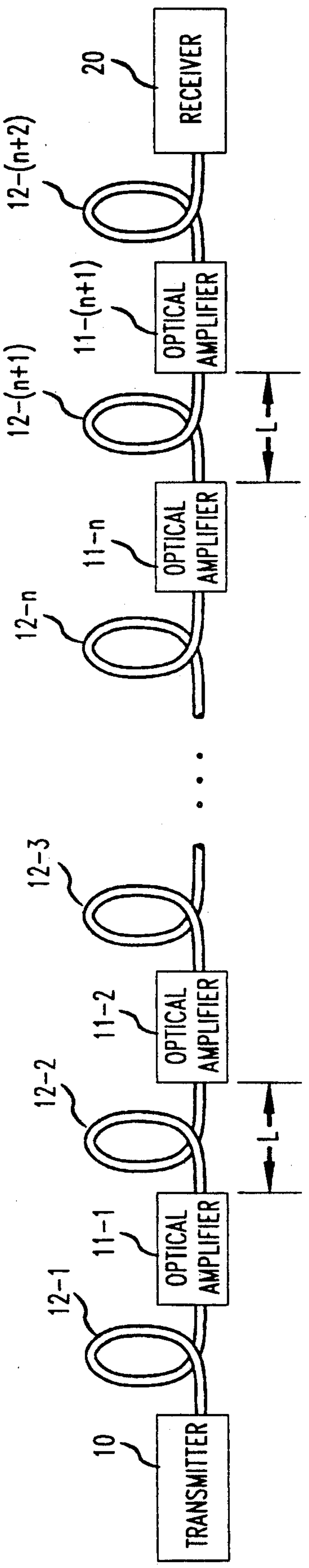
FIG. 1 is a simplified block diagram of a lightwave transmission system employing a chain of discrete optical amplifiers separated by long spans of optical fiber.

An exemplary lightwave transmission system is shown in FIG. 1. The system includes lightwave transmitter 10, a plurality of spans of optical fibers 12-1 through 12-(n+2), a plurality of optical amplifiers 11-1 through 11-(n+1), and an optical receiver 20. Soliton pulses are formed by transmitter 10 and coupled into single mode optical fiber 12-1. Since the fiber attenuates pulses propagating therethrough, pulses arriving at optical amplifier 11-1 are lower in amplitude than they were when they were coupled into fiber 12-1 at its input end. After amplification by optical amplifier 11-1, pulses continue to propagate through fiber 12-2 and so on while being periodically amplified by optical amplifiers 11-2 through 11-(n+1). When pulses reach the output end of fiber 12-(n+2), they are detected in receiver 20.

Transmitter 10 provides pulses at a center wavelength $\lambda_i$ in the pulse spectrum for coupling into fiber 12-1 which pulses have approximately a hyperbolic secant amplitude envelope and which also have a pulse width $\tau$ and a peak power related according to U.S. Pat. No. 4,406,516 (Eq. 3 therein) in order to form a fundamental soliton pulse in an appropriate fiber. Appropriate fibers for supporting soliton pulse propagation are low loss, low dispersion, single mode optical fibers providing anomalous dispersion at least at the transmission wavelength $\lambda_i$. It will become apparent below that the transmitter generates solitons having a soliton period $z_0$ in the transmission system.

As is well known in the art, only pulses whose wavelength is in the anomalous group velocity dispersion region of a single mode optical fiber can become solitons. Thus, the center wavelength of pulses from transmitter 10 are considered to be in the anomalous group velocity dispersion region of fibers 12-1 through 12-(n+2). The center wavelength is also advantageously selected to lie in a low loss region of the optical fiber. For example, in a system using silica-based optical fiber, the center wavelength is chosen to be in the low loss region around 1.55 $\mu$m.

Optical amplifiers 11-1 through 11-(n+1) change the amplitude of propagating soliton pulses by injection of electromagnetic energy into the system. These amplifiers permit the soliton pulses to remain as light throughout the entire amplification process. Successive amplifiers are shown to be spaced apart by a substantially equal distance L known as the amplification period. The gain provided by these amplifiers can be varied over a wide range which is affected by the amplification period L, the intrinsic loss of the optical fiber, the amplifier noise, and the like. In the experimental practice of this invention wherein erbium doped optical fiber amplifiers have been employed as the optical amplifiers, the amplifier gain has been maintained at values less than or equal to 10 dB in order to provide "quasi-distributed amplification" and to keep the instantaneous and accumulated amplified spontaneous emission noise sufficiently low for an adequate signal-to-noise ratio in the system. While it is described and understood that the gains of the amplifiers are substantially equal and that the amplifier spacings are substantially equal, it is contemplated that some nominal deviation from equality may be used for the amplifier gains and the amplifier spacing.

Noneelectronic amplifiers such as semiconductor amplifiers, doped-fiber amplifiers and the like are well known to those skilled in the art and are contemplated for use herein. Similarly, suitable lightwave transmitters, lightwave receivers, and optical fibers are well known to those persons of ordinary skill in the art and will not be dicussed herein.

Soliton propagation is normally considered as involving a continual balance along its path between the dispersive and nonlinear terms of the nonlinear Schrödinger equation. Consequently, it was believed that distributed amplification to uniformly compensate intrinsic loss would be necessary for long distance soliton transmission. See, for example, U.S. Pat. No. 4,699,452 and 4,881,790. Indeed, the Raman effect via distributed Raman amplification enabled the first experimental studies of such transmission using distributed amplification. See, for example, Mollenauer et al., Optics Letters, Vol. 13, pp. 675–677 (1988).

Distributed amplification for soliton propagation has been recently replaced by lumped amplification using a chain of discrete erbium doped fiber amplifiers 11-1 through 11-(n+1) separated from each other by corresponding lengths of optical fiber 12-1 through 12-(n+2) as shown in FIG. 1. In accordance with the principles of the present invention, soliton transmission is improved and optimized when the amplification period L is very short on the distance scale of significant dispersive and nonlinear effects. Amplification period is defined in terms of the length of the optical fiber span between consecutive amplifiers. The distance scale of significant dispersive and nonlinear effects is measured in terms of the soliton period $z_o$. It is well understood that the soliton period is characterized as $$z_0 = 0.322\,\frac{\pi^2 c}{\lambda^2}\cdot\frac{\tau^2}{\overline{D}},$$

where c is the speed of light in a vacuum, $\lambda_i$ is the center wavelength of the soliton, $\tau$ pulse width, and $\overline{D}$ is the path-averaged group velocity dispersion of fibers 12-1 through 12-(n+2). For the condition $L << z_0$, the soliton pulse shape including pulse width is substantially undisturbed over one amplification period. The nonlinear effect accumulated over each amplification period L is simply determined from a corresponding path-average power. Path average power $\overline{P}_{path}$ *is calculated as follows:*

$$\overline{P}_{path} = \frac{1}{l}\int_0^l P(z)dz,$$

wherein P(z) is the actual power of a soliton pulse as a function of distance and l is the length of the path. For the condition of periodic amplification, the path length l is set equal to the amplification period L or an integral number of amplification periods. By keeping the path-average power substantially equal to the usual soliton power from one amplification period to the next, it is thus possible to support well behaved soliton propagation. The usual soliton power $P_{sol}$ is the power of a soliton necessary for propagation in a substantially lossless ("ideal") optical fiber.

Figure 2:
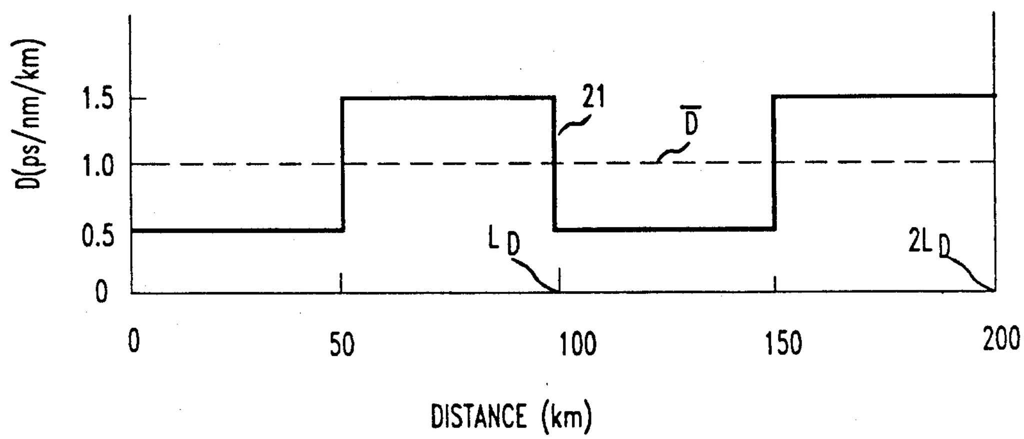
FIG. 2 shows a plot of an exemplary variation of group delay dispersion D versus distance over two amplification periods of the illustrative system of FIG. 1.

For the optical fiber system shown in FIG. 1, it is useful in the first instance to understand the inventive relationship as being between the soliton period and the amplification period. However, the amplification period is only one of several different pertubations which affects soliton propagation. One other significant perturbation for consideration is variation of dispersion D for the optical fibers. Since long optical fiber spans from one optical amplifier to the next comprise a plurality of different fiber segments wherein each segment exhibits a slightly different dispersion value as shown in FIG. 2, it is possible to control variation of dispersion by connecting the plurality of fiber segments in a manner to achieve substantially similar path average dispersion $\bar{D}$ over successive lengths of fiber defined as $L_D$. Path average dispersion $\bar{D}$ is calculated as follows:

$$\bar{D} = \frac{1}{l} \int_0^l D(z)dz$$

where D(z) is the actual dispersion of the optical fiber as a function of distance. The path average dispersion D for the fiber segments of an exemplary portion of the system as shown in FIG. 2 is shown as the dashed line labeled $\bar{D}$. While the dispersion will not be strictly periodic with respect to $L_D$, significant components of its spatial Fourier transform will be cut off for wavelengths longer than $L_D$. Thus, in analyzing a broader inventive relationship, it is contemplated that a quantity known as perturbation length, $L_{pert}$, should be less than the soliton period when the perturbation length is defined as the greater of $L_D$ and L.

Soliton pulse widths $\tau$ compatible with multi-gigabit rates are typically 30–50 psec. In turn, the realm of $z_0 >> L_{pert}$ for $L_{pert}$ in the range of ~25–50 km corresponds to group velocity dispersion D of at most a few ps/nm/km. This level of dispersion is obtained in the low loss wavelength region by using standard dispersion shifted optical fiber. Advantageously, the use of low dispersion optical fiber for transoceanic transmission distances both reduces jitter in pulse arrival times caused by the Gordon-Haus effect and scales soliton pulse pair interactions to insignificance for pair spacings greater than or equal to five soliton pulse widths.

Practical values of $z_0$ for contemplated systems satisfying the relationship $z_0 >> L_{pert}$ for the range cited above are $z_0$ on the order or several hundred kilometers or greater. In other words, several tens ($\leqq 50$) of soliton periods are needed to span the entire system length. It is now understood that this relationship between the soliton period and the total system length promotes stability of the solitons. When the number of soliton periods necessary to span the system length is on the order of one hundred or more, amplitude and pulse width of the solitons increase with increasing propagation distance. This increase introduces deleterious instability in each soliton as it propagates down the fiber. The instability is shown in a system described in *IEEE J. of Quantum Electronics*, Vol. 26, No. 4, pp. 692–700 (April 1990) wherein the described system parameters are a system length of 9000 km, amplifier spacing of 31 km, soliton period $z_0$ and is narrowly confined to be approximately 20 to 60 km. In the above-cited article, there is no provision made for variation of dispersion. As described hereinbelow and in contrast to the results of the cited article, the inventive system provides for stable soliton propagation even under real conditions of varying dispersion from fiber segment to fiber segment.

In dispersion shifted fibers, group velocity dispersion tends to vary from draw to draw by about ±0.5 ps/nm/km. Typical draw lengths are on the order of 10 to 20 km. For low dispersion fiber, this is a large fractional variation. Such variation in group velocity dispersion affects soliton propagation in a manner similar to that of energy fluctuations. As group velocity dispersion varies instantaneously and randomly along the soliton propagation path, only the path average group velocity dispersion $\bar{D}$ is of concern as long as the average is over path lengths which are short relative to $z_0$. That is, $L_D$ is much less than the soliton period.

The normalized Schrödinger equation for a lossy optical fiber is $$i\frac{\partial u}{\partial z} = \frac{\delta(z)}{2}\frac{\partial^2 u}{\partial t^2} + |u|^2 u + i\Gamma u, \quad (1)$$

where δ(z) is a normalized group velocity dispersion parameter defined as $$\delta(z) = \frac{D(z)}{\bar{D}_s}, \quad (2)$$

where D(z) is the local and $\bar{D}_s$ the system path-average group velocity dispersion.

In the inventive limit where $L_{pert}$ is much less than $z_0$, one may treat the group velocity dispersion and the nonlinearity as perturbations. To a lowest order approximation, Equation (1) is rewritten as $$\frac{\partial u}{\partial z} + \Gamma u = 0, \quad (3)$$

which has a lowest order solution of $$u = u_0(t)e^{-\Gamma z}, \quad (4)$$

with period L. Introducing Equation (4) into Equation (1), one obtains $$i\frac{\partial u_0}{\partial z} = \frac{\delta(z)}{2}\frac{\partial^2 u_0}{\partial t^2} + e^{-\alpha z}|u_0|^2 u_0, \quad (5)$$

where $\alpha = 2\Gamma$ is the energy loss rate parameter. Treating L as a differential $L = \Delta z$ with regard to the perturbations by group velocity dispersion and the nonlinearity, one obtains $$i\frac{\Delta u_0}{\Delta z} = \frac{1}{2L}\int_z^{z+L} \delta(z)dz \frac{\partial^2 u_0}{\partial t^2} + \frac{1}{L}\int_0^L e^{-\alpha z}dz|u_0|^2 u_0. \quad (6)$$

A new Schrödinger equation is written as $$i\frac{\partial u_0}{\partial z} = \frac{\bar{\delta}(z)}{2}\frac{\partial^2 u_0}{\partial t^2} + \rho|u_0|^2 u_0 \quad (7)$$

where $$\bar{\delta}(z) = \frac{1}{L}\int_z^{z+L} \delta(z)dz,$$

and where $\rho = (1 - e^{-\alpha L})/(\alpha L)$ is the ratio of path average soliton power to peak soliton power in L. If fiber segments (draws) are ordered in such a way that group velocity dispersion as averaged over each amplification period L is approximately equal to $\bar{D}_s$, that it is seen that $\delta(z) \approx 1$. For $P_{sol}$ defined as the normal soliton power in a lossless fiber, the power for a soliton at the beginning of each amplification period is $P_{sol}/\rho$ and the path average soliton power is identical to $P_{sol}$. For convenient reference, it has been determined that for real fibers one can compute the normal soliton power $P_{sol}$ as:

$$P_{sol} = 0.776 \frac{\lambda^3 A_{eff}}{\pi^2 c n_2} \frac{\bar{D}}{\tau^2} \quad (8)$$

where $\lambda$ is the wavelength of the soliton pulses, $A_{eff}$ is the effective core cross-sectional area (typically, 35 $\mu m^2$ in dispersion shifted optical fibers), $n_2$ is the nonlinear index coefficient ($3.2 \times 10^{-16}$ $cm^2/W$ in silica core fiber), and $\tau$ is the pulse full width at half maximum.

While it has been shown that the variation of group velocity dispersion can be controllable over length $L_D$ equal to the amplification period L, the variation need not be so restricted. Other variations of group velocity dispersion are contemplated such as the conditions where $L_D > L$ ($L_{pert} = L_D$) and where $L_D < L$ ($L_{pert} = L$). For the latter sets of conditions, it is possible to attain satisfactory soliton propagation provided the significantly large Fourier components of D(z) only occur at wavelengths considerably shorter than the soliton period $z_0$. That is, significantly large Fourier components of D(z) cut-off below the spatial frequency corresponding to $z_0$.

Figure 3:
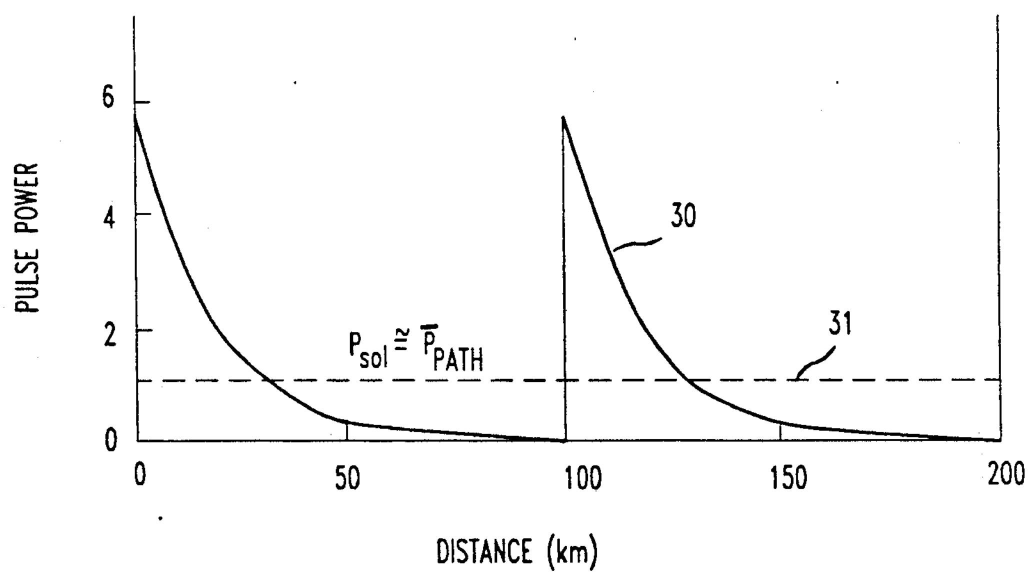
FIG. 3 shows a plot of peak normalized soliton power and path-averaged soliton power versus distance over the two amplification periods shown in FIG. 2 for the illustrative system of FIG. 1.
Figure 4:
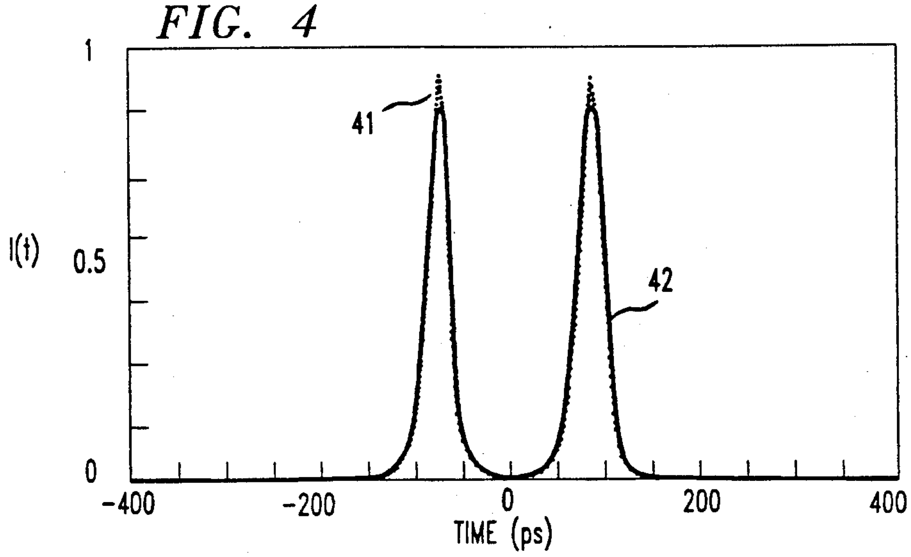
FIGS. 4, 5 and 6 show linear and log plots of normalized path average intensity of a soliton pair and its optical spectrum after a propagation of 9000 km in the exemplary system of FIG. 1.
Figure 5:
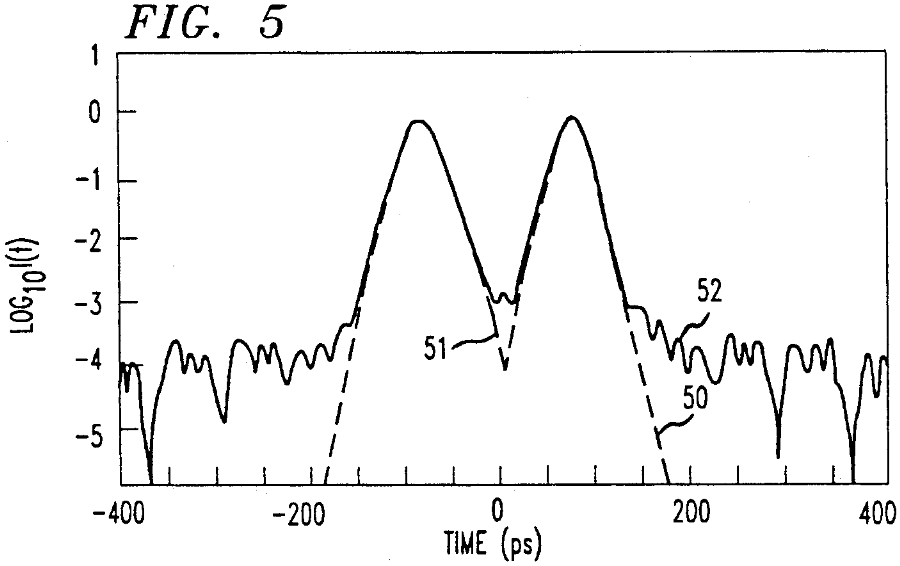
Figure 6:
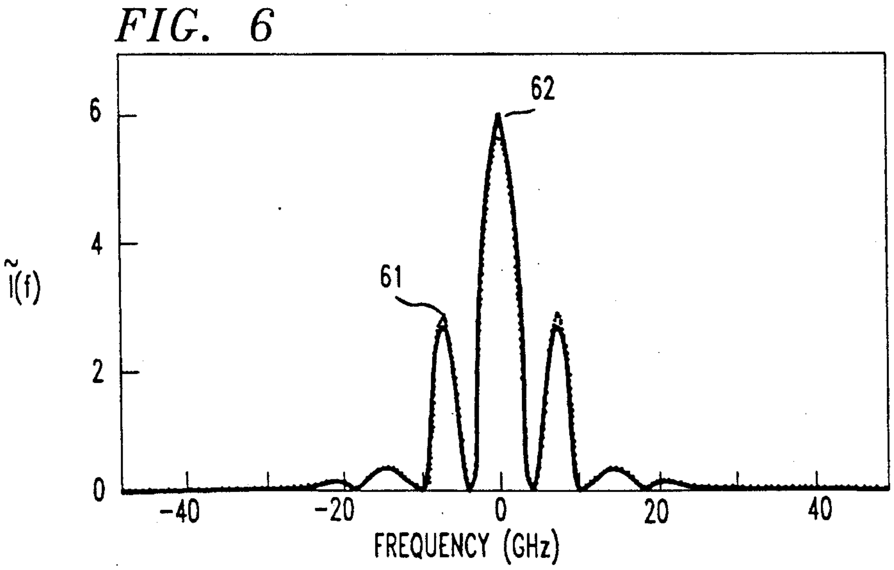

For a numerical system simulation, system parameters for amplifier spacing, dispersion characteristics, and soliton power have been selected as shown in FIGS. 2 and 3 with amplification period L=100 km. It is noted that such long amplification periods are not usually desirable on account of the excessive spontaneous emission noise associated with the corresponding high gain doped fiber amplifiers. The variation in group velocity dispersion which, for convenience, also has a period $L_D = 100$ km is shown in FIG. 2. Total system path length is established as 900 km. For soliton pulse widths $\tau$ of 50, 35, 25, 20, and 15 psec, the corresponding values of the soliton period derived from $z_0$ the formula, $$z_0 = 0.322 \frac{\pi^2 c}{\lambda^2} \frac{\tau^2}{\bar{D}} \quad (9)$$

are 980, 480, 240, 160, and 90 km, respectively, when the soliton wavelength $\lambda$ is 1.56 $\mu m$. Soliton pulses with soliton periods ($z_0$) of 980 km and 480 km, which far exceed the perturbation length of 100 km, experience virtually no distortion in pulse shape or pulse spectrum after propagating over the entire system length. When the soliton pulses exhibited a period ($z_0$) of 240 km, which is only $2.4 \cdot L_{pert}$, there was a slight deviation noted between pulses launched in pairs at the system input and pulses output after propagating over 9,000 km. This deviation is shown in FIGS. 4, 5 and 6 where the input soliton pulse pair characteristic is shown plotted in dotted curves 41, 51, and 61, respectively, and the output soliton pulse pair characteristic is shown plotted in solid curves 42, 52, and 62, respectively. The curves in FIGS. 4 and 5 depict linear and log scale representation of soliton pulse intensity I as a function of time. FIG. 6 shows the frequency spectrum of the soliton pulse intensity.

As the soliton period approached and became less than the perturbation length at $z_0 = 160$ km and 90 km, soliton pulse shapes and spectra were seen to degrade in the system simulation. When the soliton pulse degrades, it loses energy to dispersive wave radiation. This is evidenced by the occurrence of wings or skirts on the pulse pair shown in log intensity curve 52 in FIG. 5 from −400 ps to −200 ps and from 200 ps to 400 ps. Ordering of the fiber segments to reverse the dispersion characteristic of FIG. 2 without changing the periods $L_D$ further reduced pulse perturbation.

In another example from experimental practice, an ultra-long distance, high bit rate, soliton transmission system was simulated using recirculating loops of dispersion-shifted optical fiber ($D \approx 1$–2 ps/mum/km). The fiber loops were approximately 75 to 100 km in length and low gain erbium doped fiber amplifiers were inserted every 25 to 30 km. After 9000 km transmission at 2 Gbps, soliton pulses of 50 psec pulse width showed an effective width of 63 psec. An error rate of better than $10^{-9}$ was achieved using semiconductor laser sources nominally at 1.5 $\mu m$.

From the analysis above, it is observed that solitons are remarkably resilient to large variations in energy and dispersion as long as the characteristic length scale of those variations, that is, the perturbation length, is much less than $z_0$. As a result, there appears to be no barrier to the use of lumped amplifiers, nor to the use of practical dispersion shifted optical fibers, in ultra long distance, soliton transmission systems.

DESCRIPTION OF WAVELENGTH DIVISION MULTIPLEXED SOLITON SYSTEM

One attractive feature of the all-optical approach to ultra long distance transmission afforeded by soliton transmission is that it facilitates wavelength division multiplexing (WDM). For most transmission modes, nonlinear interactions between pulses at different wavelengths and the nonlinear characteristics of the optical fiber tend to cause severe interchannel interference. In an optical fiber system utilizing distributed amplification to uniformly canceled intrinsic fiber loss, it has been shown that solitons at different wavelengths, that is, different wavelengths, are transparent to each other during a collision so that each colliding soliton emerges from a mutual collision with its velocity, shape, and energy unaltered. See, for example, an article L. F. Mollenauer et al. in *IEEE J. of Quantum Elect.* Vol. QE-22, pp. 157 et seq. (1986). In the description below, it is shown that such transparency is also maintained in an optical fiber transmission system implemented in accordance with the principles of the invention using lumped amplifiers such as doped fiber amplifiers, by maintaining the collision length sufficiently long relative to the perturbation length. The collision length is defined as the distance over which solitons travel through an optical fiber while passing through each other. The perturbation length has been defined in terms of the amplification period measured as the spacing between optical amplifiers and as a possibly longer period of variation of another parameter perturbing soliton travel such as chromatic dispersion of the optical fiber. It will be described below that a wavelength division multiplexed system is capable of implementation for at least several multi-gigabit per second (Gbps) WDM channels having a total bandwidth of several nanometers where the fiber spans a transoceanic distance (7000–9000 km).

Figure 7:
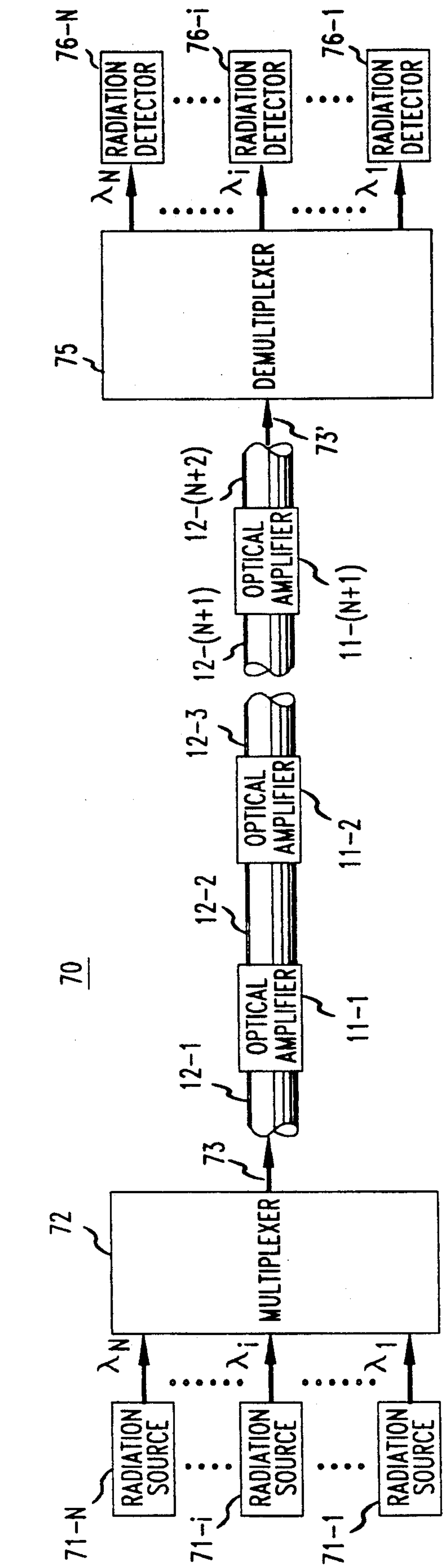
FIG. 7 shows a wavelength division multiplexed soliton transmission system.

FIG. 7 schematically depicts an exemplary soliton communication system 70 according to the principles of the invention. Radiation sources 71-1 . . . 71-N each emit a stream of electromagnetic radiation pulses of center wavelength $\lambda_i$, i=1 . . . N, N≦2, (e.g., 2≦N≦20), respectively. The pulses interact with a multiplexer 72, e.g., an optical grating, which serves to combine the N pulse streams into a single pulse stream 73 which is coupled into single mode (at all the wavelengths $\lambda_i$) optical fiber 12-1. The pulses in the multiplexed pulse stream are of a type that can form fundamental optical solitons in the optical fiber. The coupled-in pulses are guided through the fiber to an output location where a single pulse stream 73 is coupled from the fiber into demultiplexer 75, exemplarily also an optical grating. The demultiplexer serves to divide pulse stream 73, into the various component streams of center wavelength $\lambda_i$, which are then detected by radiation detectors 76-1 . . . 76-N.

At one or more intermediate points along the optical fiber, optical amplifiers are disposed to amplify the soliton pulses by, for example, stimulated emission of doping ions. Such well known components as means for modulating the radiation sources to impress information of the soliton pulses, attenuators, coupling means, and signal processing means are not shown in FIG. 7. It is understood that actual communication systems typically permit bidirectional signal transmission either alternately over the same fiber or utilizing two or more separate fibers.

As is well known, only pulses whose wavelength is in the anomalous group velocity dispersion region of single mode optical fiber can become solitons. Thus all the center wavelengths $\lambda_i$ of the inventive communication system have to be in the anomalous group velocity dispersion region of fiber 12. Furthermore, the center wavelengths of a system according to the invention are advantageously chosen to lie in a low loss wavelength region of the optical fiber. For instance, in a system using silica-based fiber, the center wavelengths advantageously are chosen to be in the low loss region at or near about 1.55 μm. Moreover, as will be understood from the description below, the radiation sources and/or the multiplexers generate the soliton pulse streams at center wavelengths which are separated by a sufficient wavelength difference to cause the collision length to be greater than or equal to two perturbation lengths.

As is well known, the refractive index of materials is a function of wavelength. Thus, the phase and group velocities of electromagnetic radiation in a dielectric such as silica are a function of wavelength, and pulses of different wavelengths will have different propagation speeds in optical fiber. Consequently, if two or more pulse streams (having different $\lambda_i$) are propagating simultaneously in the same direction in a fiber, pulses of one pulse stream will move through those of another pulse stream. If the pulses are linear pulses, then such "collisions" between pulses by definition do not have any effect on the colliding pulses. On the other hand, a collision between nonlinear pulses (i.e., pulses whose characteristics depend on the presence of nonlinearity in the refractive index of the transmission medium) is in general expected to result in an interaction between the pulses. Solitons are nonlinear pulses, and it can therefore be expected that a collision between solitons will have an effect on the colliding pulses.

Even though co-propagating soliton pulses of different wavelengths do interact when the overtaking pulse moves through the overtaken pulse, the interaction leaves, for all practical purposes, the individual solitons intact. For instance, in a fiber transmission channel without loss the only significant consequence of a collision is that the overtaking soliton is moved slightly ahead of its normal position, and the overtaken one is slightly retarded. Even a large number of collisions will produce a net displacement of at most a few pulse widths $\tau$, with the variance of the displacement being a small fraction of $\tau^2$.

Furthermore, the soliton-preserving quality of the collisions between co-propagating solitons of different wavelengths continues to hold in the presence of perturbations such as are present in real communications systems, e.g., distributed fiber loss, variations in fiber core diameter, lumped loss, and lumped gain. Thus, a wavelength division multiplexed soliton communication system is feasible and herein techniques and formulae are disclosed below to permit the design of such a system.

Consider a pair of solitons with optical frequency difference Δf traveling together down a lossless and otherwise unperturbed fiber wherein the higher frequency (higher velocity) soliton initially is behind the lower frequency (higher velocity) soliton pulse. In the arrangement of pulses, it is assured that the two soliton pulses will eventually collide as they propagate along the optical fiber. For convenience, let the reference frame move with the mean velocity of the two pulses, and let (retarded) time t and distance of propagation down the fiber z be expressed in the usual soliton units ($t_c=\tau/1.763$ where $\tau$ is the pulse intensity full width at half maximum (FWHM), and $z_c=(2/\pi)z_0$, where $z_0$ is the soliton period). Let the solitons have angular frequencies $\pm\Omega$, respectively ($\Omega$=radians/$t_c$, so $\Delta f=\Omega/(\pi t_c)$). When the solitons are well separated, the envelope function of the slower of the two solitons is written as $$u=\text{sech}(t-\Omega z)\exp(i)(\Omega t+\phi) \quad (10)$$

where $\phi=(1-\Omega^2)z/2$, with similar expression for the other soliton. From Equation (10), it follows that the equation of motion for the center of the pulse is $t=\Omega z$. Although it is an angular frequency, Ω also plays the role of a reciprocal velocity which is the rate of change of time per unit distance traveled. Let the characteristic collision length $L_{coll}$ begin and end where the solitons overlap at their half power points. From the equation of motion, one then has $\tau/t_c=\Omega L_{coll}/z_c$, or, when translated entirely to actual units, $$L_{coll} = 0.6298\,\frac{z_0}{\tau\Delta f} = \frac{2\tau}{D\Delta\lambda}, \quad (11)$$

where Δλ is the interchannel wavelength difference, that is, the wavelength difference between colliding solitons. During the collision, the two solitons undergo a velocity shift which is valid when $\Omega>>1$ so that the spectra of the solitons do not overlap. The velocity shift is expressed below as, $$\delta\Omega = \frac{1}{2\Omega} \int dt \operatorname{sech}^2(t - \Omega z)\operatorname{sech}^2(t + \Omega z) = \frac{2}{\Omega} \frac{[2\Omega z\cosh(2\Omega z) - \sinh(2\Omega z)]}{(\sinh(2\Omega z))^3} \quad (12)$$

From Equation (3), it is seen that $\delta\Omega_{max}=2/(3\Omega)$, and that $\delta\Omega$ returns to zero after the collision is over. The only net result of the collision is a displacement in time of each soliton, obtained by integrating Equation (3) using the integral form shown above over $$\delta t = \pm\Omega^{-2}, \quad (13)$$

where the + and − signs apply to the slower and the faster of the colliding soliton pulses, respectively. Collisions retard the slower soliton pulse from the WDM channel at $\lambda_i$ and advance the faster soliton pulse from the WDM channel at $\lambda_j$. Equation (13) approximates the exact result $\delta t = \pm\ln(1+\Omega^{-2})$ known from inverse scattering theory, when $\Omega >> 1$. In practical units for the soliton transmission system, Equation (13) becomes $$\delta t = \pm 0.1786 \frac{1}{\tau(\Delta f)^2}. \quad (14)$$

Since pulses of a given wavelength division multiplexed channel will tend to suffer a range of collisions, from none at all to a maximum given by $N = Z\tau/(L_{coll}T)$, where Z is the total system length and T is the bit period, there will be a spread of arrival times for the soliton pulses about the mean. This spread is given by multiplying Equation (14) by N/2 to obtain, $$\Delta t = \pm 0.1418 \frac{L}{z_0} \frac{\tau}{T} \frac{1}{\Delta f}. \quad (15)$$

It is now seen that the maximum allowable $\Delta t$ sets a limit on the minimum allowable $\Delta f$.

As described above for a single wavelength channel, soliton pulses are substantially unaffected by perturbations whose period is much shorter than $z_0$. For example, solitons having a pulse width $\tau$ in the range of 30–50 psec traversing an optical fiber having dispersion $D \sim 1$ psec/nm/km, for which $z_0$ is at least several hundred kilometers, have no difficulty traversing a system of length approximately 10,000 km. with lumped amplifiers spaced apart as much as 100 km.

For wavelength division multiplexed soliton transmission systems, the use of large amplification periods tends to be limiting. Consider, for example, a soliton-soliton collision centered about an optical amplifer, where the collision length is less than the amplification period. For the first half of the collision, the solitons collide in a low intensity region preceding the optical amplifier. In the second half of the collision, the solitons experience the gain of the amplifier and, therefore, higher intensities. As a result, the acceleration of the solitons is initially diminished for the first half of the collision whereas the acceleration of the solitons is subsequently augmented during the second half of the collision. Unbalancing of the acceleration yields a net velocity shift. Such velocity shifts, when multiplied by the remaining fiber distances to the system terminus, can result in a large jitter in pulse arrival times.

Variation of the fiber chromatic (group velocity) dispersion parameter D along the path also has the potential to unbalance the collision. Dispersion for actual dispersion shifted fibers tends to vary by about ±0.5 ps/nm/km from draw to draw. When these fibers are spliced together in a transmission system, the interface between fibers may exhibit a step change in the dispersion.

Consider, for example, a collision centered about a step change in dispersion. Although the acceleration has the same absolute peak value for each half of the collision, the collision duration and, therefore, the collision length $L_{coll}$ is different for each half of the collision corresponding to the different prevailing values of dispersion on either side of a fiber splice. Thus, the integral of the soliton pulse acceleration over the entire collision, and hence the net velocity shift, is non-zero.

With all other conditions fixed, the net velocity (frequency) shift of a collision is always a periodic function of the position, or phase, of the collision with respect to a periodic perturbation.

Figure 8:
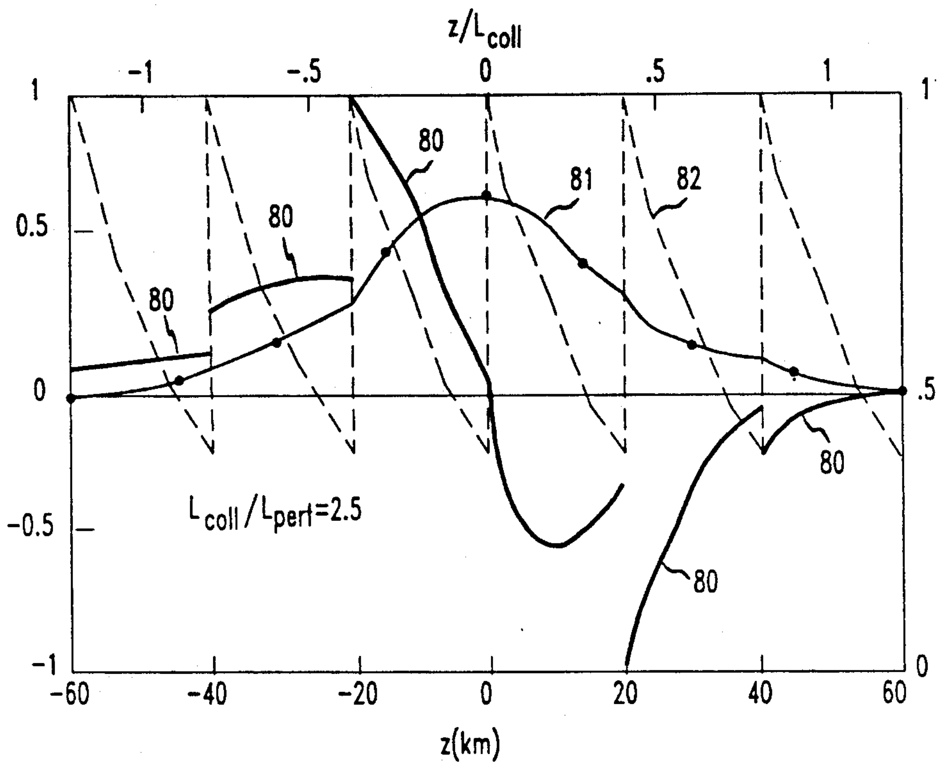
FIG. 8 shows curves for acceleration, velocity and soliton pulse energy as a function of distance during collisions of a pair of solitons in the system of FIG. 7.

In the description above, examples were presented in which the collision length was shorter than or comparable to the perturbation length. As the collision length is made substantially larger than the perturbation length, it is now expected that the symmetry of the acceleration function would be at least partially restored. Hence, the net velocity shifts would be reduced. It has now been discovered by me that this expectation is fulfilled and exceeded. Consider, for example, a collision centered on an optical amplifier as described above wherein $L_{col}=50$ km, but the amplification period is reduced to 20 km. Although the acceleration (FIG. 8, curve 80) is discontinuous and highly distorted, the resultant velocity (FIG. 8, curve 81) is remarkably close to that of an uperturbed fiber. It is particularly important, of course, that the net velocity change is essentially zero, and that this result obtains no matter where the collision is centered with respect to the amplifiers. In FIG. 8, curve 82 shows the variation of soliton pulse energy through the wavelength division multiplexed soliton transmission system.

To explore this discovery further, a systematic study has been made by me using direct numerical solution of the nonlinear Schrödinger equation for collisions between soliton pulses in a wavelength division multiplexed soliton transmission sytem as in FIG. 7 wherein $L_{pert}$ in the range 20–40 km. In order to achieve this range of values for $L_{pert}$ in a comprehensive manner, the lumped amplifier spacing L and the periodic variation of the fiber dispersion $L_D$ have been analyzed separately and in combination. Specifically, the amplification period has been set to 20 km and the variation of dispersion has been set to have a period of 20 km or 40 km.

Figure 9:
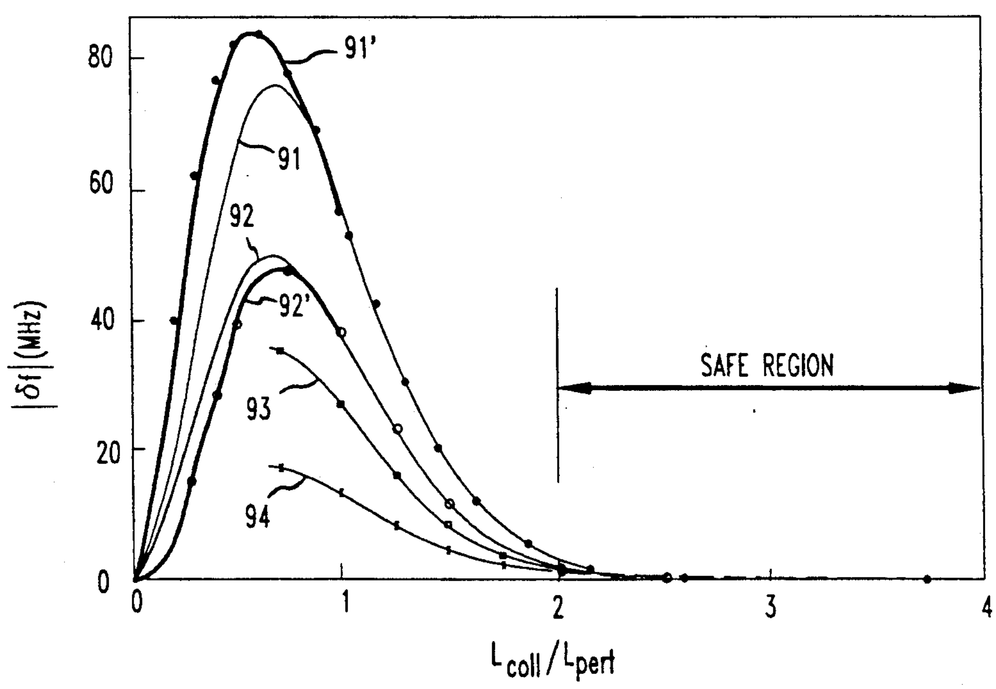
FIG. 9 shows curves for net absolute frequency shift resulting from collisions between solitons having a 50 psec pulse width as a function of $L_{coll}/L_{pert}$.

FIG. 9 shows the net absolute velocity shifts plotted as a function of the ratio $L_{coll}/L_{pert}$, where $L_{pert}$ is the longest perturbation period from either L or $L_D$ as defined above. The ratio $L_{coll}/L_{pert}$ was varied different values of $L_{pert}$ by changing the frequency spacing between channels to vary $L_{coll}$. With respect to dispersion variation, $L_{coll}$ is based on the path average dispersion, $\bar{D}$. The phase of the collision relative to the perturbation was held constant and equal to a desired value which yielded maximum effect for values of $L_{coll}/L_{pert} > 1$. Collected data points from this analysis tended to fit a curve of universal shape independent of the particular values for the collision length or the perturbation length. It was noted that only the height of the curve changed to account for perturbations of different strengths. As the results are now understood, they are believed to be sufficiently general to apply for any perturbation period and not just to the particular perturbation periods described in FIG. 9. From my analysis, it has been determined that the velocity shifts are negligible for $L_{coll}/L_{pert} \lesssim 2$. As a result, a large and universal "safe region" shown in FIG. 9 has been discovered within which a wavelength division multiplexed soliton transmission system may be designed to operate using lumped amplifiers. This region is far different one used in prior art wavelength division multiplexed soliton transmission systems where $L_{coll}/L_{pert}$ was chosen less than 0.5 in order to maintain small velocity shifts. Of course, the criteria set forth for the design of a single channel soliton transmission system also applies with the new criterion defining the "safe region". In the safe region, the behavior of soliton-soliton collisions for different multiplexed channels is virtually indistinguishable from that obtaining in an unpertubed fiber.

In FIG. 9, heavy solid line curves 91′ and 92′ involve all significantly large harmonics of the perturbation whereas light solid line curves 91 through 94 involve only the fundamental component of the perturbation.

Curves 91 and 91′ has been computed for a wavelength division multiplexed soliton transmission system realized in accordance with the principles of the invention wherein the optical amplifiers are spaced 20 km apart (L=20 km) and the optical fiber exhibits a substantially periodic dispersion characterized in that the dispersion is substantially constant for each successive 20 km segment and the segments are arranged to have dispersions which alternate between 0.5 ps/nm/km and 1.5 ps/nm/km so that the path average dispersion is equal to 1 ps/nm/km and $L_D=L_{pert}=40$ km. Step changes in dispersion, that is, splices to different optical fiber segments, occur at each optical amplifier for maximizing the combined effects of the different perturbations. For the faster soliton pulses, the value of $\delta f$ is negative.

Curves 92 and 92′ have been computed for a wavelength division multiplexed soliton transmission system realized in accordance with the principles of the invention wherein the optical amplifiers are spaced 20 km apart (L=20 km) and the optical fiber exhibits a substantially periodic dispersion characterized in that the dispersion is substantially constant for each successive 10 km segment and the segments are arranged to have dispersions which alternate between 0.5 ps/nm/km and 1.5 ps/nm/km so that the path average dispersion is equal to 1 ps/nm/km and $L=L_D=L_{pert}=20$ km. Step changes in dispersion, that is, splices to different optical fiber segments, occur at the optical amplifiers in such a manner that the larger dispersion fiber precede the amplifiers and the smaller dispersion fibers follow the amplifiers. This arrangement of segments maximizes the combined effects of the different perturbations. For the faster soliton pulses, the value of $\delta f$ is positive.

Curve 93 has been computed for a theoretical wavelength division multiplexed soliton transmission system realized with "lossless" optical fiber thereby eliminating the optical amplifiers and wherein the "lossless" optical fiber exhibits a periodic dispersion characterized in that the dispersion is substantially constant for each successive 10 km segment and the segments are arranged to have dispersions which alternate between 0.5 ps/nm/km and 1.5 ps/nm/km so that the path average dispersion is equal to 1 ps/nm/km and $L_D=L_{pert}=20$ km. For the faster soliton pulses, the value of $\delta f$ is positive.

Curve 94 has been computed for a wavelength division multiplexed soliton transmission system realized in accordance with the principles of the invention wherein the optical amplifiers are spaced 20 km apart (L=20 km) and the optical fiber exhibits a substantially constant dispersion of 1 ps/nm/km over the entire system length so that there is no variation of dispersion. For the faster soliton pulses, the value of $\delta f$ is positive.

Maximum allowable frequency (or wavelength) separation between channels is determined from the border of this safe region for a given perturbation length. By setting $L_{coll}=2L_{pert}$ in Equation (11) and solving for $\Delta f$, we obtain $$\Delta f_{max} = 0.31 \frac{z_0}{\tau L_{pert}} . \tag{16}$$

It has also been found that at least for $L_{coll}/L_{pert} > 1$, the effect of a periodic perturbation depends almost exclusively on its fundamental Fourier component. For a periodic perturbation and when only the fundamental Fourier component term is required, the curve of frequency shift has the form:

$$\delta\Omega = AL_{pert} \frac{x^4}{\sinh^2 x} \tag{17}$$

where $x=\pi^2/2\Omega L_{pert}=2.80L_{coll}/L_{pert}$, and where the amplitude A is computed from details of the perturbation. As shown in FIG. 9, normalized curves for Equation (17) match computer simulated results extremely well for $L_{coll}/L_{pert} \geqq 1$, while for $L_{coll}/L_{pert} \leqq 1$, it is in general necessary to include higher order Fourier components. The essentially quadratic behavior of Equation (17) for $L_{coll}/L_{pert} << 1$ is consistent with the $\Omega^{-2}$ dependence of the velocity shifts described in U.S. Pat. No. 4,700,339.

It is noted that when the colliding pulses from different wavelength multiplexed channels overlap at the input or output of the fiber, acceleration will be unbalanced. Although this effect is generally of no consenquence when it occurs at the output of the system, it can be considered when it occurs at the input because resultant velocity shifts multiplied by the system length can cause serious deviations in pulse arrival time. To overcome this problem, one should adjust the relative timing among multiplexed channels such that soliton pulses avoid significant overlap at the fiber input. The above solution assumes that the bit rate in all channels is determined by a common clock. It is understood that this requirement would tend to limit the maximum number of channels to about $T/\tau$.

In a fiber with very low polarization dispersion, it is contemplated that signals from adjacent channels can be injected into the system with orthogonal polarizations.

Practical implications of this invention are best understood from the following specific example. Consider a 9000 km long system with $L_{pert}=40$ km, $\bar{D}=1$ psec/nm/km, employing channels of 4 Gbits/s each ($\tau=50$ psec solitons with minimum separation ($5\tau$); $z_0=930$ km. Then from Equation (16) we have $\Delta f_{max}=146$ GHz, or $\delta\lambda_{max}=1.2$ nm. According to Equation (15), setting $\Delta f_{min}$ to one quarter of that value yields a spread in arrival times $\Delta t=\pm 7.5$ psec from interaction between two adjacent channels. When interaction with all other channels is taken into account, the worst case jitter would be three times that amount, or ±22.5 psec. The predicted error rates are still much less than $10^{-12}$. Thus, one could have as many as 5 channels, for a total of 20 Gbits/sec on a single fiber in a wavelength division multiplexed soliton transmission system over transoceanic distances. Furthermore, since a system of closely spaced amplifiers having low individual gain has the potential to be bidirectional, and since counter-propagating signals do not interact, the total bidirectional capacity of the fiber could be as great as 40 Gbits/sec for the exemplary system cited above.

It is contemplated that the soliton pulse width may vary from one multiplexed channel to the next. However, it is desirable to maintain soliton pulse widths at a substantially equal value.

What is claimed is:

1. A lightwave transmission system for propagation of soliton pulses comprising:

means for generating a sequence of pulses of electromagnetic radiation at a predetermined wavelength, each pulse having a pulse width $\tau$;

a single mode optical fiber having anomalous group velocity dispersion in a spectral region that includes the predetermined wavelength, the optical fiber exhibiting substantially equal path average group velocity dispersion for each successive path of length $L_D$ along the optical fiber;

means for coupling the sequence of pulses into the optical fiber at an input location, the coupled-in pulses being of the type for forming fundamental solitons in the optical fiber wherein the solitons exhibit a soliton period $z_0$ related to both the pulse width $\tau$ and the path average group velocity dispersion, the coupled-in pulses propagating through the optical fiber from the input location to an output location; and a plurality of means for amplifying the coupled-in pulses at predetermined, locations along the optical fiber intermediate the input location and the output location wherein adjacent means for amplifying are spaced apart from each other by a distance L, each amplifying means increasing the coupled-in pulses to have a path average power substantially equal to a standard soliton power, and the ratio of the distance L to the soliton period is significantly less than unity.

2. The lightwave transmission system as defined in claim 1 wherein the ratio of the distance L to the soliton period is less than or equal to $\frac{1}{3}$.

3. The lightwave transmission system as defined in claim 1 wherein a ratio of total length Z for the optical fiber to the soliton period $z_0$ is less than or equal to 50.

4. A lightwave transmission system for propagation of soliton pulses comprising:

means for generating a sequence of pulses of electromagnetic radiation at a predetermined wavelength, each pulse having a pulse width $\tau$;

a single mode optical fiber having anomalous group velocity dispersion in a spectral region that includes the predetermined wavelength, the optical fiber exhibiting substantially equal path average group velocity dispersion for each successive path of length $L_D$ along the optical fiber;

means for coupling the sequence of pulses into the optical fiber at an input location, the coupled-in pulses being of the type for forming fundamental solitons in the optical fiber wherein the solitons exhibit a soliton period $z_0$ related to both the pulse width $\tau$ and the path average group velocity dispersion, the coupled-in pulses propagating through the optical fiber from the input location to an output location; and a plurality of means for amplifying the coupled-in pulses at predetermined, locations along the optical fiber intermediate the input location and the output location wherein adjacent means for amplifying are spaced apart from each other by a distance L, each amplifying means increasing the coupled-in pulses to have a path average power substantially equal to a standard soliton power, and the ratio of the length $L_D$ to the soliton period is significantly less than unity.

5. The lightwave transmission system as defined in claim 4 wherein the ratio of the length $L_D$ to the soliton period is less than or equal to $\frac{1}{3}$.

6. The lightwave transmission system as defined in claim 4 wherein a ratio of total length Z for the optical fiber to the soliton period $z_0$ is less than or equal to 50.

7. A lightwave transmission system for propagation of soliton pulses comprising:

means for generating a sequence of pulses of electromagnetic radiation at a predetermined wavelength, each pulse having a pulse width $\tau$;

a single mode optical fiber having anomalous group velocity dispersion in a spectral region that includes the predetermined wavelength, the optical fiber exhibiting substantially equal path average group velocity dispersion for each successive path of length $L_D$ along the optical fiber;

means for coupling the sequence of pulses into the optical fiber at an input location, the coupled-in pulses being of the type for forming fundamental solitons in the optical fiber wherein the solitons exhibit a soliton period $z_0$ related to both the pulse width $\tau$ and the path average group velocity dispersion, the coupled-in pulses propagating through the optical fiber from the input location to an output location; and a plurality of means for amplifying the coupled-in pulses at predetermined, locations along the optical fiber intermediate the input location and the output location wherein adjacent means for amplifying are spaced apart from each other by a distance L, each amplifying means increasing the coupled-in pulses to have a path average power substantially equal to a standard soliton power, and the ratio of a system perturbation length to the soliton period is significantly less than unity wherein the system perturbation length is the greater of either the length $L_D$ or the distance L.

8. The lightwave transmission system as defined in claim 7 wherein the ratio of the system perturbation length to the soliton period is less than or equal to $\frac{1}{3}$.

9. The lightwave transmission system as defined in claim 7 wherein a ratio of total length Z for the optical fiber to the soliton period $z_0$ is less than or equal to 50.

10. A lightwave transmission system for propagation of soliton pulses wherein the transmission system is a multiplexed soliton transmission system which comprises N channels, where N is an integer greater than or equal to 2, any $i^{th}$ channel of the multiplexed soliton communication system, for i equal to 1, 2, . . . , N, comprising:

means for generating a sequence of pulses of electromagnetic radiation of wavelength $\lambda_i$, the wavelength $\lambda_i$ being less than the wavelength $\lambda_{i+1}$ to exhibit an interchannel spacing $\Delta\lambda=\lambda_{i+1}-\lambda_i$, and each pulse having a pulse width $\tau_i$;

means for multiplexing the N sequences of pulses to form a multiplexed sequence of pulses;

a single mode optical fiber having anomalous group velocity dispersion in a spectral region that includes the wavelength $\lambda_i$, the optical fiber exhibiting substantially equal path average group velocity dispersion for each successive path of length $L_D$ along the optical fiber;

means for coupling the multiplexed sequence of pulses into the optical fiber at an input location, all coupled-in pulses being of the type for forming fundamental solitons in the optical fiber wherein the solitons exhibit a soliton period $z_{0,i}$ related to both the pulse width $\tau_i$ and the average group velocity dispersion, the coupled-in pulses propagating through the optical fiber from the input location to an output location; and a plurality of means for amplifying the coupled-in pulses of the multiplexed sequence at predetermined, locations along the optical fiber intermediate the input location and the output location wherein adjacent means for amplifying are spaced apart from each other by a distance L, each amplifying means increasing the coupled-in pulses to have a path average power substantially equal to a standard soliton power, the ratio of the distance L to the soliton period $z_{0,i}$ is significantly less than unity, and a collision length related to the interchannel spacing is less than or equal to twice the distance L.

11. The lightwave transmission system as defined in claim 10 wherein the ratio of the distance L to the soliton period is less than or equal to $\frac{1}{8}$.

12. The lightwave transmission system as defined in claim 10 wherein a ratio of total length Z for the optical fiber to the soliton period $z_{0,i}$ is less than or equal to 50.

13. The lightwave transmission system as defined in claim 10 wherein the soliton periods for all channels are substantially equal.

14. A lightwave transmission system for propagation of soliton pulses wherein the transmission system is a multiplexed soliton transmission system which comprises N channels, where N is an integer greater than or equal to 2, any $i^{th}$ channel of the multiplexed soliton communication system, for i equal to 1, 2, . . . , N, comprising:

means for generating a sequence of pulses of electromagnetic radiation of wavelength $\lambda_i$, the wavelength $\lambda_i$ being less than the wavelength $\lambda_{i+1}$ to exhibit an interchannel spacing $\Delta\lambda=\lambda_{i+1}-\lambda_i$, and each pulse having a pulse width $\tau_i$;

means for multiplexing the N sequences of pulses to form a multiplexed sequence of pulses;

a single mode optical fiber having anomalous group velocity dispersion in a spectral region that includes the wavelength $\lambda_i$, the optical fiber exhibiting substantially equal path average group velocity dispersion for each successive path of length $L_D$ along the optical fiber;

means for coupling the multiplexed sequence of pulses into the optical fiber at an input location, all coupled-in pulses being of the type for forming fundamental solitons in the optical fiber wherein the solitons exhibit a soliton period $z_{0,i}$ related to both the pulse width $\tau_i$ and the average group velocity dispersion, the coupled-in pulses propagating through the optical fiber from the input location to an output location; and a plurality of means for amplifying the coupled-in pulses of the multiplexed sequence at predetermined, locations along the optical fiber intermediate the input location and the output location wherein adjacent means for amplifying are spaced apart from each other by a distance L, each amplifying means increasing the coupled-in pulses to have a path average power substantially equal to a standard soliton power, the ratio of the length $L_D$ to the soliton period $z_{0,i}$ is significantly less than unity, and a collision length related to the interchannel spacing is less than or equal to twice the length $L_D$.

15. The lightwave transmission system as defined in claim 14 wherein the ratio of the length $L_D$ to the soliton period is less than or equal to $\frac{1}{8}$.

16. The lightwave transmission system as defined in claim 14 wherein a ratio of total length Z for the optical fiber to the soliton period $z_{0,i}$ is less than or equal to 50.

17. The lightwave transmission system as defined in claim 14 wherein the soliton periods for all channels are substantially equal.

18. A lightwave transmission system for propagation of soliton pulses wherein the transmission system is a multiplexed soliton transmission system which comprises N channels, where N is an integer greater than or equal to 2, any $i^{th}$ channel of the multiplexed soliton communication system, for i equal to 1, 2, . . . , N, comprising:

means for generating a sequence of pulses of electromagnetic radiation of wavelength $\lambda_i$, the wavelength $\lambda_i$ being less than the wavelength $\lambda_{i+1}$ to exhibit an interchannel spacing $\Delta\lambda=\lambda_{i+1}-\lambda_i$, and each pulse having a pulse width $\tau_i$;

means for multiplexing the N sequences of pulses to form a multiplexed sequence of pulses;

a single mode optical fiber having anomalous group velocity dispersion in a spectral region that includes the wavelength $\lambda_i$, the optical fiber exhibiting substantially equal path average group velocity dispersion for each successive path of length $L_D$ along the optical fiber;

means for coupling the multiplexed sequence of pulses into the optical fiber at an input location, all coupled-in pulses being of the type for forming fundamental solitons in the optical fiber wherein the solitons exhibit a soliton period $z_{0,i}$ related to both the pulse width $\tau_i$ and the average group velocity dispersion, the coupled-in pulses propagating through the optical fiber from the input location to an output location; and a plurality of means for amplifying the coupled-in pulses of the multiplexed sequence at predetermined, locations along the optical fiber intermediate the input location and the output location wherein adjacent means for amplifying are spaced apart from each other by a distance L, each amplifying means increasing the coupled-in pulses to have a path average power substantially equal to a standard soliton power, the ratio of a system perturbation length to the soliton period is significantly less than unity wherein the system perturbation length is the greater of either the length $L_D$ or the distance L, and a collision length related to the interchannel spacing is less than or equal to twice the distance L.

19. The lightwave transmission system as defined in claim 18 wherein the ratio of the perturbation length to the soliton period is less than or equal to ⅓.

20. The lightwave transmission system as defined in claim 18 wherein a ratio of total length Z for the optical fiber to the soliton period $z_{0,i}$ is less than or equal to 50.

21. The lightwave transmission system as defined in claim 18 wherein the soliton periods for all channels are substantially equal.

* * * * *